July 7, 1936. H. SINCLAIR 2,046,703

HYDRAULIC COUPLING

Filed June 30, 1933

Harold Sinclair
per
Dean Fairbank Hirsch & Foster
attys

Patented July 7, 1936

2,046,703

UNITED STATES PATENT OFFICE 2,046,703

HYDRAULIC COUPLING

Harold Sinclair, Surbiton, England

Application June 30, 1933, Serial No. 678,411
In Great Britain July 12, 1932

20 Claims. (Cl. 60—54)

The present invention relates to hydraulic couplings of the kinetic type where in an annular hydraulic circuit for the working liquid is formed by a vaned impeller element and a vaned runner element co-axial with the impeller element, the arrangement being such that working liquid passes directly from the impeller into the runner and thence directly back into the impeller again, the torque ratio thus being 1 to 1. Such couplings can be so designed that, although of relatively small size, they are capable of transmitting power with a high efficiency, for instance exceeding 98 per cent., when the hydraulic circuit is full. However, when high-efficiency couplings of the type described are employed under certain conditions of operation, violent fluctuations may occur in the value of the torque transmitted. For example, in one known arrangement of power transmission system the coupling, which is of the vulcan type wherein the driving and driven vanes lie in planes containing the coupling axis, is connected between a driving machine and a driven machine having high inertia. With this arrangement, while the driving machine is rotating, the driven machine may be started from rest by admitting liquid to the hydraulic circuit of the coupling, and the driven machine may be retarded or stopped by partly or wholly emptying the hydraulic circuit. It has been found however, that when the driven machine has in this way been accelerated or retarded, as the case may be, to a certain speed, the slip being high, undesirable torque surges may occur which are so severe as to render the arrangement impracticable for certain applications.

Experiments suggest the following explanation of this surging. Assuming that the driving machine is running at full speed and that the driven machine is at rest, the hydraulic circuit being empty. Liquid is now admitted to the coupling, and owing to the high relative speed, particles of liquid are shattered against the stationary runner vanes, setting up a torque sufficient to overcome the resistance of the load. Under these circumstances (the coupling axis being horizontal) liquid in the upper part of the runner gravitates back to the inlet of the impeller circuit, while liquid in the lower part of the runner gravitates to the outermost part of the circuit; thus there is a partial circulation of liquid between the impeller and the runner which is sufficient to give rise to the required starting torque.

When the runner speed attains about one-third of the impeller speed, the centrifugal force due to the rotation of the runner is sufficient to overcome the return feed towards the impeller inlet due to gravity, and the liquid in the runner circuit is therefore thrown to the outermost part of the circuit, where it collects, thus stopping the partial circulation which had previously been effective in accelerating the runner from rest. Under this condition, the liquid at the outermost part of the runner circuit is violently churned by the passage of the impeller vanes, but the torque drops suddenly to a low value since there is little or no circulation.

The volume of the ring of liquid now collected at the outer part of the runner circuit increases owing to further filling and/or to the centrifugal draining of the radially inner part of the circuit, until it overflows the radially inner part of the core guide ring in the hydraulic circuit and thus initiates a vortex circulation around this ring.

Similarly in the case of a coupling having no core guide ring, when the volume of liquid collected at the outer part of the runner circuit exceeds a critical value, a vortex motion commences to take the place of the previous indeterminate churning.

In consequence of the slight vortex circulation thus set up, the angle which the stream of liquid discharged by the impeller makes with the runner vanes becomes reduced, with the result that the circulation grows stronger, which in turn further reduces this angle, until there suddenly forms a shallow but very powerful vortex ring and the torque instantly rises to a high value. This condition is not sustained however, and the vortex ring becomes attenuated and breaks down for several reasons including the following. The high velocity of circulation creates a sudden back pressure, which forces liquid out of the working circuit; also part of the circulating stream is retained by wetting the surfaces of the radially inner portions of the coupling. Following the disruption of the vortex ring the liquid is again thrown to the outer part of the runner, where it collects, and the cycle is repeated.

Such surging continues until the slip decreases sufficiently to permit a stable vortex ring to be formed, after which point the drive is smoothly maintained. A similar phenomenon also occurs during retardation of the driven machine.

It is proposed, in the specification of my co-pending patent application Serial No. 635,795 filed 1st October 1932, to employ means such as baffles intended to hinder the sudden formation of a thin vortex ring. While such devices may satisfactorily reduce the amplitude of the power surges, they do not in all cases prevent the sudden drop in torque that precedes the surge.

It is an object of the present invention to provide an improved hydraulic coupling of the type set forth wherein the tendency to power surges is eliminated or considerably reduced, and wherein the preliminary sudden drop in torque is minimized.

I have discovered that a critical factor governing the performance of such couplings during the periods of filling and emptying appears to be the angles made by the impeller and runner vanes with the flow and return junctions between the impeller and runner elements.

According to the present invention, in a hydraulic coupling of the type hereinbefore set forth, and wherein means are provided for varying the liquid content of the hydraulic circuit while the coupling is operating, the arrangement of the impeller and runner vanes is such that the liquid passages formed between them and constituting the hydraulic circuit undergo substantial change of direction at at least one of the junctions between the impeller and the runner elements. By suitably selecting the angles which the vanes make with the flow and return junctions, the passage of liquid from one to the other of the coupling elements during acceleration of the runner can be hindered or facilitated as desired, with the consequence that the sudden breakdown and re-formation of the vortex ring as hereinbefore described is prevented.

In hydraulic gears of the kinetic type, such as Föttinger gears, where the ratio of input torque to output torque is other than the 1—to—1 ratio characteristic of hydraulic couplings, it is usual to provide a substantial change of direction at at least one of the junctions between the various elements constituting the hydraulic working circuit, the angle representing such change of direction being determined in accordance with well-known principles governing the design of hydraulic turbine machinery. However, the maximum efficiency of power transmission of such hydraulic gears is limited to about 87 per cent. The hydraulic friction that occurs in the reaction element of the hydraulic circuit of such gears, besides accounting for a substantial part of the unavoidable power loss, tends to prevent the formation of an unstable high velocity circulation; and so far as I am aware, such gears are not subject to very serious surging, but their low efficiency in many applications places them under a serious disadvantage as compared with the more efficient hydraulic coupling. Furthermore, the first cost of a gear is considerably higher than that of a coupling of comparable rating.

It has also been proposed to provide in hydraulic couplings of the kinetic type (that is, devices having an impeller and a runner but no fixed reaction element) vanes so arranged that the liquid passages forming the hydraulic circuit undergo substantial change of direction at a junction between the impeller and runner elements; but in such proposed arrangements no means were included for varying the liquid content of the hydraulic circuit while the coupling was operating; consequently the problem of overcoming the torque surges that occur during emptying and filling of the hydraulic circuit would not arise.

The invention will be described by way of example with reference to the accompanying drawing, in which:—

Figure 1:
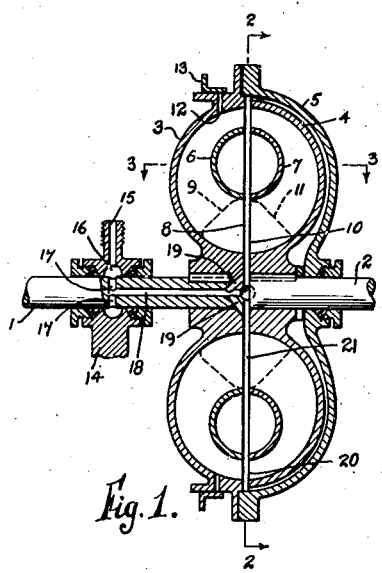
Fig. 1 is a sectional side elevation of one form of improved coupling according to the invention.
Figure 2:
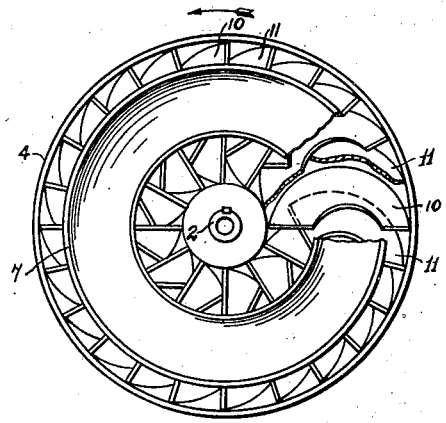
Fig. 2 is an end elevation, taken on the line 2—2 of Fig. 1, of the coupling runner, certain parts being broken so as to show the construction more clearly.
Figure 3:
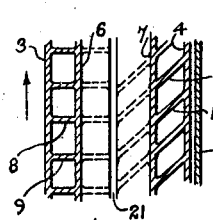
Fig. 3 is a developed section of the hydraulic circuit taken on the line 3—3 of Fig. 1.

Referring to Figs. 1 to 3, the impeller and runner elements comprise dished shells 3 and 4, the bosses of which are keyed to a driving shaft 1 and a driven shaft 2 respectively. These shells are juxtaposed to form an annular hydraulic circuit chamber containing a core guide member formed by similar rings 6 and 7 supported in the impeller and runner respectively by series of alternate long and short vanes, which are denoted by 8 and 9 on the impeller and 10 and 11 on the runner respectively. The hydraulic circuit is thus bounded by the dished shells and the core guide rings, and the liquid passages constituting the hydraulic circuit are formed between adjacent vanes 8 and 9 on the impeller and adjacent vanes 10 and 11 on the runner, the flow junction 20 and the return junction 21 between the impeller and runner elements lying in a common plane normal to the axis of rotation of the coupling.

A dished casing 5, secured to the periphery of the impeller shell 3, encloses the back of the runner and forms with the impeller an enclosed working chamber. Exhaust ports 12 are formed near the periphery of the impeller, controlled by a ring valve 13 of known type which is capable of being operated to open and close the ports 12 while the coupling is running.

Means for admitting liquid to the hydraulic circuit while the coupling is operating include a stationary sleeve 14 surrounding the driving shaft 1 and provided with an annular chamber 16 communicating with an inlet union 15. Radial ports 17 in the shaft 1 and debouching from the chamber 16 are connected by an axial bore 18 with inclined ports 19, whereby liquid can flow from the union 15 into the hydraulic circuit.

The impeller vanes 8 and 9 lie in planes containing the coupling axis and are thus normal to the junction plane, while the runner vanes 10 and 11 are plane but inclined to the junction plane at an angle of about 45 deg. in such a manner that their entry and discharge edges trail with reference to the normal direction of rotation of the coupling indicated by the arrows in Figs. 2 and 3. The developed section of the circuit shown in Fig. 3 shows that the liquid passages undergo a change of direction of 45 deg. at the return junction 21, and it is obvious that the same change of direction takes place at the flow junction 20.

This form of coupling is not subject to power surges, and is capable of yielding a maximum efficiency approaching the order of that attained, under corresponding conditions, with the ordinary type of vulcan coupling wherein both sets of vanes are disposed normal to the junction plane.

The difficulty of observation has precluded determination of the flow conditions in this coupling, but it is believed that, since the angle which the stream discharged by the impeller makes with the runner vanes is smaller than in the ordinary type of coupling, the initial stable vortex circulation, hereinbefore referred to, is established earlier, causing the drive to be smoothly taken up, while the formation of an unstable high-velocity vortex circulation is prevented by the retarding effect of the increased angle which the return flow makes with the impeller vanes.

It would thus appear that, if the runner vanes are inclined at too small an angle to the junction plane, the minimum slip/torque ratio of the coupling will be too high, while, if the runner vanes are inclined at too large an angle, surging will occur. The inclination should therefore be such that the change of direction of the hydraulic circuit passages at the junction plane, while not sufficient to reduce seriously the efficiency of the coupling, is nevertheless substantial enough to reduce the surging to an unobjectionable value, which will depend on circumstances. For example, where the coupling is employed in a power transmission system having an electric driving motor, the factor limiting the magnitude of the surges permissible may be the instantaneous over-load capacity of this motor.

Figures 4, 5:
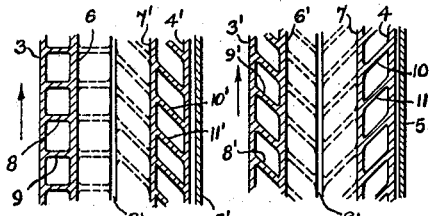
Figs. 4 and 5 are developed sections, taken similarly to the section shown in Fig. 3, of two alternative forms of improved coupling.

Fig. 4 shows a modification which is free from surges, but in which the minimum slip, under given conditions, is considerably higher than in the arrangement first described. This modification however, enables the torque at which the coupling stalls to have a substantially lower value than is possible with the ordinary type of vulcan coupling, and it is therefore serviceable in applications where it is essential to limit the maximum torque that can be transmitted. In this case the vanes of the impeller are as described with reference to Figs. 1 to 3. The runner vanes 10' and 11' are disposed between the shell 4' and the core ring 7' similarly to the vanes shown in Fig. 2, except that they are so inclined that their edges lead with reference to the normal direction of rotation of the coupling, which is indicated by the arrow in Fig. 4.

In the arrangement shown in Fig. 5, the slip characteristic of which is somewhat similar to that of the coupling described with reference to Fig. 4, and which is likewise free from surges, the runner is as shown in Figs. 1 to 3, while the impeller vanes 8' and 9', which are disposed between a shell 3' and a core ring 6', are inclined to the junction plane at an angle of 45 deg. in such a direction that their edges trail with reference to their normal direction of rotation, as indicated by the arrow.

Couplings may be constructed in accordance with the invention, with vanes which are not plane. For example, the edges of the vanes in one of the coupling elements may be set at a leading angle to one of the junctions, and normal to the other junction. In the arrangement shown in Figs. 6 and 7, the impeller vanes are plane and normal to the junction plane, as is evident from Fig. 7, where the shells of the coupling elements are omitted. The runner comprises a shell 4" and a core ring 7", as previously described, between which are disposed alternate long and short vanes 10" and 11" so arranged that their radially inner portions are plane and are normal to the junction plane, while their radially outer portions are curved, so that the entry edges lie at an angle of 67½ deg. to the junction plane and lead with reference to their normal direction of rotation, which is indicated by arrows. The minimum slip/torque ratio of this coupling is low, so that a high efficiency of transmission is obtainable with a relatively small coupling for a given duty. The couping is, however, subject to a small surge, which would be unobjectionable in certain applications.

Figure 6:
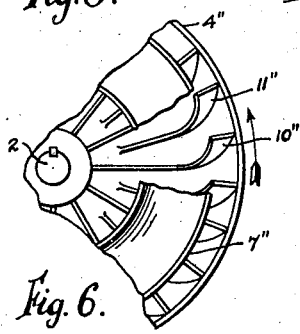
Fig. 6 is an end elevation of part of the runner of a further alternative form of coupling, with certain parts broken to show the construction.
Figure 7:
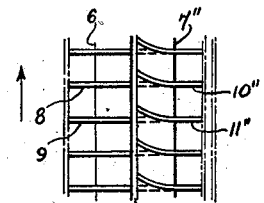
Fig. 7 is a developed view, in a radially inward direction, of the vanes of the last-mentioned form of coupling.

If in the type of coupling shown in Figs. 6 and 7 the angle made by the entry edges of the runner vanes with the junction plane is reduced to 45 deg. the coupling is free from surges, but the slip increases to about twice that occurring in an ordinary vulcan coupling, but the efficiency is nevertheless somewhat higher than the efficiency of the coupling shown in Figs. 1 to 3.

It is apparent that the arrangements of vanes described with reference to the accompanying drawings, whereby a substantial change of direction is provided at a junction between the coupling elements, may be departed from in carrying the invention into effect; but owing to the very large number of arrangements of vanes that can be devised, it has been impossible to determine all the limits of departure beyond which the object of the present invention would not be attained.

I claim:

1. A hydraulic coupling comprising an impeller element and a runner element, each including a dished annular shell containing vanes extending in a direction having a radial component and between which are formed liquid passages, said elements being juxtaposed so as to form between said shells the annular working circuit such that liquid can pass directly from said impeller passages into said runner passages and thence directly back to said impeller passages, and means for varying the liquid content of said circuit while the coupling is operating, the end portions of the vanes of one of said elements being so inclined in respect to the adjacent end portions of the vanes of the other element at one of said junctions as to cause at said junction a substantial change in the direction of said passage whereby the occurrence of power surges of objectionable magnitude is prevented when said coupling is but partially filled with liquid.

2. A hydraulic coupling comprising an impeller element and a runner element, each including a dished annular shell containing vanes extending in a direction having a radial component and between which are formed liquid passages, said elements being juxtaposed so as to form between said shells an annular working circuit such that liquid can pass directly from said impeller passages into said runner passages and thence directly back to said impeller passages, and means for varying the liquid content of said circuit while the coupling is operating, the arrangement of the impeller and runner vanes being such that said liquid passages undergo an abrupt and substantial change of direction at the flow junction between said elements, whereby the occurrence of power surges of objectionable magnitude is obviated.

3. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements in such a manner that their edges trail with reference to the normal direction of rotation of the coupling, and said liquid passages undergoing substantial change of direction at at least one of said junctions.

4. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements at an angle of not less than 45 deg. and not more than 67½ deg. in such a manner that their edges trail with reference to the normal direction of rotation of the coupling, and said liquid passages undergoing substantial change of direction at at least one of said junctions.

5. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow junction between said elements in such a manner that their entry edges lead with reference to the normal direction of rotation of the coupling, and said liquid passages undergoing substantial change of direction at said junction.

6. A hydraulic coupling comprising an impeller element and a runner element, each including a dished annular shell containing vanes extending in a direction having a radial component and between which are formed liquid passages, said elements being juxtaposed so as to form between said shells an annular working circuit such that liquid can pass directly from said impeller passages into said runner passages and thence directly back to said impeller passages, and means for varying the liquid content of said circuit while the coupling is operating, said runner vanes being inclined to the flow junction between said elements at an angle of not less than 45 deg. and not more than 67½ deg. and said liquid passages undergoing an abrupt and substantial change of direction at said junction.

7. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements at an angle of not less than 45 deg. and not more than 67½ deg. and said liquid passages undergoing substantial change of direction at at least one of said junctions.

8. A hydraulic coupling comprising an impeller element and a runner element, each including a dished annular shell containing vanes extending in a direction having a radial component and between which are formed liquid passages, said elements being juxtaposed so as to form between said shells an annular working circuit such that liquid can pass directly from said impeller passages into said runner passages and thence directly back to said impeller passages, and means for varying the liquid content of said circuit while the coupling is operating, said runner vanes being curved in such a manner that their discharge ends are substantially normal to the return junction and their entry ends are inclined to the flow junction between said elements, and said liquid passages undergoing substantial change of direction at at least one of said junctions.

9. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being curved in such a manner that their discharge ends are substantially normal to the return junction and their entry ends are inclined to the flow junction between said elements in such a manner that their edges lead with reference to the normal direction of rotation of the coupling, and said liquid passages undergoing substantial change of direction at said flow junction.

10. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements and the impeller vanes being substantially normal to said junctions.

11. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements at an angle of not less than 45 deg. and not more than 67½ deg., and the impeller vanes being substantially normal to said junctions.

12. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements at an angle of not less than 45 deg. and not more than 67½ deg. in such a direction that their edges trail with reference to the normal direction of rotation of the coupling, and the impeller vanes being substantially normal to said junctions.

13. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being inclined to the flow and to the return junctions between said elements in such a manner that their edges trail with reference to the normal direction of rotation of the coupling, and the impeller vanes being inclined to said junctions in such a manner that their edges trail with reference to said normal direction.

14. A hydraulic coupling comprising an impeller element and a runner element, each including a dished annular shell containing vanes extending in a direction having a radial component and between which are formed liquid passages, said elements being juxtaposed so as to form between said shells an annular working circuit such that liquid can pass directly from said impeller passages into said runner passages and thence directly back to said impeller passages, and means for varying the liquid content of said circuit while the coupling is operating, said runner vanes being so curved that their discharge ends are substantially normal to the return junction and their entry ends are inclined to the flow junction between said elements, and said impeller vanes being substantially normal to said junctions.

15. A hydraulic coupling of the type hereinbefore set forth comprising a vaned impeller element, a vaned runner element co-axial with said impeller element, said elements having liquid passages formed between the vanes thereof, which passages constitute the hydraulic working circuit, and means for varying the liquid content of said circuit while the coupling is operating, the runner vanes being so curved that their discharge ends are substantially normal to the return junction and their entry ends are inclined to the flow junction between said elements at an angle of not less than 45 deg. and not more than 67½ deg. in such a direction that their edges lead with reference to the normal direction of rotation of the coupling, and the impeller vanes being substantially normal to said junctions.

16. A hydraulic coupling comprising an impeller element and a runner element, each including a dished annular shell containing vanes extending in a direction having a radial component and between which are formed liquid passages, said elements being juxtaposed so as to form between said shells the annular working circuit such that liquid can pass directly from said impeller passages into said runner passages and thence directly back to said impeller passages, and means for varying the liquid content of said circuit while the coupling is operating, the arrangement of the impeller and runner vanes being such that said liquid passages undergo a change of direction of not less than 22½ deg. and not more than 90 deg. at at least one of the junctions between said elements.

17. A hydraulic coupling comprising an impeller element and a runner element, each including a dished annular shell containing vanes extending in a direction having a radial component and between which are formed liquid passages, said elements being juxtaposed so as to form between said shells an annular working circuit such that liquid can pass directly from said impeller passages into said runner passages and thence directly back to said impeller passages, and means for varying the liquid content of said circuit while the coupling is operating, the arrangement of said impeller and runner vanes being such that said liquid passages undergo an abrupt change of direction of not less than 22½ deg. and not more than 45 deg. at the flow junction between said elements.

18. A hydraulic coupling comprising an impeller element and a runner element each including a dished annular shell containing vanes extending in a direction having a radial component and between which are formed liquid passages, said elements being juxtaposed so as to form between said shells the annular working circuit such that liquid can pass directly from said impeller passages into said runner passages and thence directly back to said impeller passages, and means for varying the liquid content of said circuit while the coupling is operating, the discharge ends of the vanes in one of said elements making with the entry ends of respectively adjacent vanes on the other of said elements an angle of not less than 90° and not more than 157½°, whereby the occurrence of objectionable power surges is obviated.

19. A hydraulic coupling comprising an impeller element and a runner element each including a dished annular shell containing vanes extending in a direction having a radial component and between which are formed liquid passages, said elements being juxtaposed so as to form between said shells the annular working circuit such that liquid can pass directly from said impeller passages into said runner passages and thence directly back to said impeller passages, and means for varying the liquid content of said circuit while the coupling is in operation, the discharge ends of the impeller vanes being disposed at an angle of not less than 22½ deg. and not more than 90 deg. to the entry ends of respectively adjacent runner vanes.

20. A hydraulic coupling comprising a rotatable impeller element and a rotatable runner element coaxial with said impeller element, each of said elements including a dished annular shell containing vanes extending in a direction having a radial component and between which are formed liquid passages, said elements being juxtaposed, one on either side of a plane to which the axis of said elements is normal, so as to form between said shells an annular working circuit such that said plane contains the flow and return junctions of said liquid passages between said elements, and means for varying the liquid content of said circuit while the coupling is in operation, the vane ends in said driving element at at least one of said junctions making with said plane an angle, measured on the side of the vanes which trails with respect to the normal direction of rotation of the coupling, which differs by not less than 22½ deg. and not more than 90 deg. from the angle made by the vane ends in said driven element at said one of said junctions, said second mentioned angle being measured on the side of the vanes which leads with respect to said normal direction of rotation.

HAROLD SINCLAIR.